United States Patent

Bieker

[11] Patent Number: 5,839,547
[45] Date of Patent: Nov. 24, 1998

[54] APPLICATION ARRANGEMENT FOR A DISC BRAKE

[75] Inventor: Dieter Bieker, Oberaudorf, Germany

[73] Assignee: Knorr Bremse Systeme Fur Nutzfahrzeuge GmbH, Munich, Germany

[21] Appl. No.: 727,676

[22] PCT Filed: Feb. 17, 1995

[86] PCT No.: PCT/DE95/00210

§ 371 Date: Oct. 17, 1996

§ 102(e) Date: Oct. 17, 1996

[87] PCT Pub. No.: WO95/32370

PCT Pub. Date: Nov. 30, 1995

[30] Foreign Application Priority Data

May 20, 1994 [DE] Germany .......................... 44 17 783.6

[51] Int. Cl.[6] ...................................................... F16D 55/00
[52] U.S. Cl. .......................................... 188/73.31; 267/30
[58] Field of Search ................................. 188/72.3, 73.31, 188/73.35–73.38; 267/30

[56] References Cited

U.S. PATENT DOCUMENTS

| 2,920,884 | 1/1960 | Rowland et al. | 267/30 X |
| 3,730,509 | 5/1973 | Jorn | 267/30 X |
| 4,364,455 | 12/1982 | Oshima | 188/72.3 X |
| 4,629,037 | 12/1986 | Madzgalla et al. | 188/72.3 X |

*Primary Examiner*—Peter M. Poon
*Attorney, Agent, or Firm*—Barnes & Thornburg

[57] ABSTRACT

In an application arrangement for a disc brake including a brake lining compartment having two lateral guide surfaces extending in the application direction for guiding and supporting a brake lining which can be displaced by the application arrangement, a plate is situated on the assigned wall surface of the brake lining compartment or on the lateral edge of the brake lining and is disposed so that it can be rollably or slidably displaced with respect to the wall surface along a predetermined path.

19 Claims, 9 Drawing Sheets

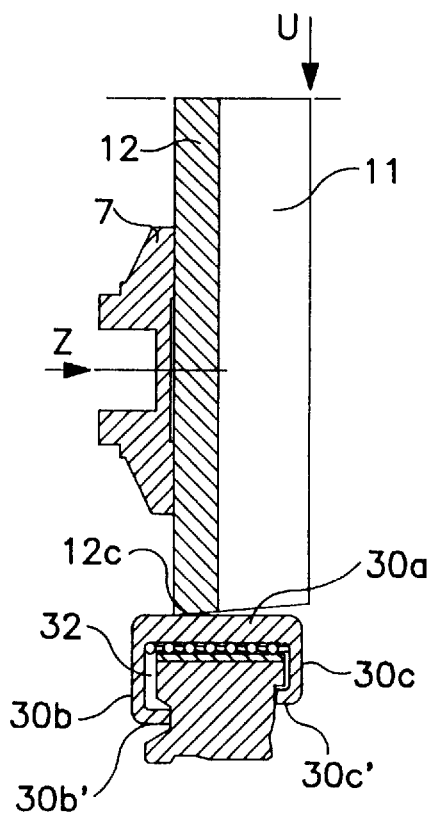
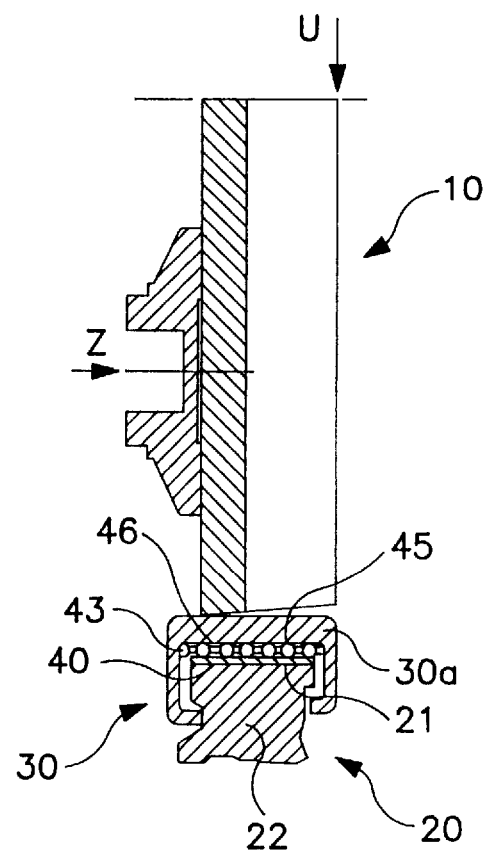
FIG. 6A
FIG. 6B
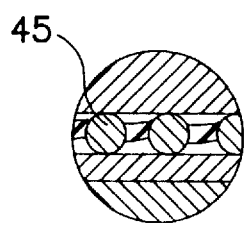
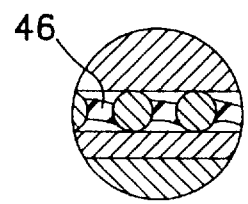
FIG. 6C
FIG. 6D

APPLICATION ARRANGEMENT FOR A DISC BRAKE

BACKGROUND AND SUMMARY OF THE INVENTION

The present invention relates generally to an application arrangement for a disc brake and more specifically wherein the brake lining is guided and supported by a brake lining housing. The object of the present application is also a brake lining constructed according to the teaching of the invention.

In conventional application arrangements for a disc brake, a brake lining compartment is normally provided for accommodating a brake lining which can be displaced by the application arrangement and which has two lateral guide surfaces which extend in the application direction and on which the brake lining is displaceably guided by its two lateral edges.

When the application arrangement is actuated for braking, the brake lining is displaced by it in the direction of the brake disc and finally rests by means of its friction surface against the corresponding lateral surface of the brake disc. Because of the brake friction forces, the brake lining is moved toward the downstream-side or outlet-side guide surface of the brake lining compartment and is then supported on this guide surface. In contrast, in the non-applied or brake-free condition, the brake lining rests comparatively loosely in the brake lining compartment.

As soon as, during the application of the disc brake in the initial phase of the braking operation, the brake lining rests on the brake disc and, in this case, finally, as mentioned above, touches the downstream-side guide surface of the brake lining compartment, the rotational moving force of the brake disc is transmitted to this downstream-side support of the brake lining and causes a friction force there which counteracts the application force. During the further application of the disc brake, this friction force must therefore additionally be overcome by the application arrangement.

In the most frequently used disc brakes in which the lining compartments of the above-mentioned type are normally also used, a so-called floating caliper is provided as the caliper. When the brake lining is in contact, because of the reaction forces acting in the axial direction, the caliper is displaced with the brake disc in the opposite direction and, in the process presses another brake lining situated on the opposite side also against the brake disc. Since this opposite brake lining is guided in a substantially identically constructed lining compartment, an equally large friction force occurs on its downstream-side guide surface. This additionally stresses the application arrangement.

The above-mentioned friction forces on the respective downstream-side guide surface of the lining compartment therefore have the disadvantage that the application arrangement must apply an increased braking force, whereby the overall efficiency of the disc brake is considerably reduced. In practice, the required braking force is increased between 10% and 30%.

However, another, even more serious disadvantage of these undesirable friction forces is that, as a result, the so-called circumferential diagonal wear is caused. The reason is that conventional application arrangements introduce their application force centrally into the brake lining while the respective friction force of the brake linings operates only on one side. This result in an overall asymmetrical force distribution in the brake lining so that this brake lining is pressed against the brake disc with a non-uniform force. Therefore the brake lining is worn more for a long period of time on its upstream or inlet-side area where the applied application force is larger. Thus, a wear profile which extends diagonally in the circumferential direction results which correspondingly reduces the useful life of the brake lining.

From German Patent Application DE 22 30 949 A1, an application device for a disc brake is known in which it is suggested to reduce the disadvantageous friction forces on the downstream-side guide surface of the lining compartment by a leaf spring which is stiff in the lateral direction and which is fastened at least on one side of a pressure plate of the brake lining in parallel to this pressure plate and rests with one of its ends on the downstream-side guide surface of the brake lining compartment. As soon as the brake lining during the application of the disc brake in the initial phase of the braking operation rests against the brake disc, it is supported by the end of the leaf spring on the guide surface of the brake lining compartment. Because of the small contact surface of the leaf spring, a high local friction force occurs there. Thus, during the further application, the leaf spring cannot be further displaced but bends instead. Therefore, the application device must overcome no additional friction forces so that the degree of the brake effect is clearly increased, particularly since the force required for the bending of the leaf spring is relatively low. However, a disadvantage of this known application device is the fact that the bending of the leaf spring causes a corresponding transverse position of the brake lining so that the occurrence of circumferential diagonal wear cannot be prevented.

In an alternative embodiment of the application device known from German Patent Document DE 22 30 949 A1, it is suggested to dispose the brake lining in a displaceable manner on guide rods consisting of a coil or a stack of supporting discs. When, during the application of the disc brake, the brake lining rests on the brake disc, the outlet-side guide rod is bent so that no friction forces are transmitted on the brake lining. Since the force required for the bending of the guide rod is comparatively low, the brake efficiency is increased correspondingly as in the case of the first-mentioned embodiment. However, because of the bending of the guide rod, a transverse position of the brake lining can also not be prevented, so that a circumferential diagonal wear will also occur.

It is an object of the invention to further develop an application arrangement for a disc brake in such a manner that, the brake efficiency is improved and simultaneously, a minimizing of the circumferential diagonal wear can be achieved. Furthermore, a brake lining is to be provided which is also distinguished by an improvement of the brake efficiency and is subject to only a low circumferential diagonal wear.

According to the invention, this object is achieved by forming the respective guide surface of the brake lining compartment by a plate which is disposed on the assigned wall surface of the brake lining compartment or on the lateral edge of the brake lining in such manner that it is rollably or slidably displaced with respect to the wall surface in the application direction along a predetermined path. Because of this rolling or sliding bearing, no friction forces are transmitted to the brake lining when the brake lining rests on the brake disc during the application of the disc brake. Since the friction forces occurring during the braking displace the plate displaced in the application direction toward the brake disc, the brake lining, in contrast to the known application arrangement, is displaced precisely in parallel to the brake disc. That is, the brake lining is subjected to no tilting so that any circumferential diagonal wear can be avoided.

The predetermined path along which the plate according to the invention is displaceably disposed, in practice must be selected to be at least as large as the displacement path still to be implemented when the brake lining is in contact. However, this displacement path is relatively small, so that the implementation of the displaceable bearing presents no problems.

According to the further development of the invention, it is recommended to prestress the plate against the application direction such that, after the release of the brake, it moves back into its starting position. As a result, the operability of the bearing according to the invention exists at any point in time. The desired prestressing force may be achieved, for example, by the fact that the plate is prestressed by a spring element, which preferably consists of a rubber material, against the application direction. In this case, the plate should be a part of a spring bow element. Optionally, this spring bow element may be clamped with such a large inherent elasticity that the prestressing force can be achieved without any additional spring element.

A particularly advantageous and low-cost bearing of the spring bow element according to the invention is achieved if the spring bow element is fastened on an area of the brake lining compartment which is constructed essentially with a T-shaped cross-section, for example, in a clamping fit. When the brake lining consists of a brake lining material and a pressure plate acted upon by the application device, it may, in contrast, be considered to fasten the spring bow element on the lateral edge of the pressure plate. In this case, the device according to the invention for reducing the friction forces is part of the corresponding brake lining so that, also in the case of older application arrangements, possibly within the scope of a brake lining change which is required anyhow, the advantages of the invention can be achieved without any problems.

For the purpose of the invention, different bearing arrangements are suitable, particularly slide bearings in the form of a teflon bearing or in the form of several steel lamellae or in the form of a roller bearing formed of several rollers. Particularly low-cost and robust embodiments of the steel lamellae or roller bearings according to the invention will be achieved if the steel lamellae or rollers are embedded in a rubber material, for example, by vulcanizing.

According to the further development of the invention, the friction force can be further reduced when the face of the plate facing the wall surface of the brake lining compartment is constructed as an oblique plane sloping down in the application direction. In this case, a forward component of the reaction force of the pressure force acting upon the plate, which overcomes the residual friction force, is transmitted to the brake lining.

For reasons of cost, it may finally be considered to provide the plate according to the invention only on that side of the brake lining compartment which is the outlet side during the forward driving of the vehicle. The reason is that braking operations during reverse driving of the vehicle are much rarer and, in addition, are usually connected with lower braking forces so that, as required, the absence of the plate according to the invention can be accepted there without any disadvantages.

According to the invention, a brake lining is also to be protected by the invention on the lateral edge(s) of which the plate according to the invention is provided.

In the following, the invention will be explained in detail by the description of embodiments with a reference to the drawing.

BRIEF DESCRIPTION OF THE DRAWINGS

FIGS. 6A. to 6D are views of a third embodiment of the application arrangement in which a steel roller bearing is used;

DETAILED DESCRIPTION OF THE EMBODIMENTS

Figure 1A:
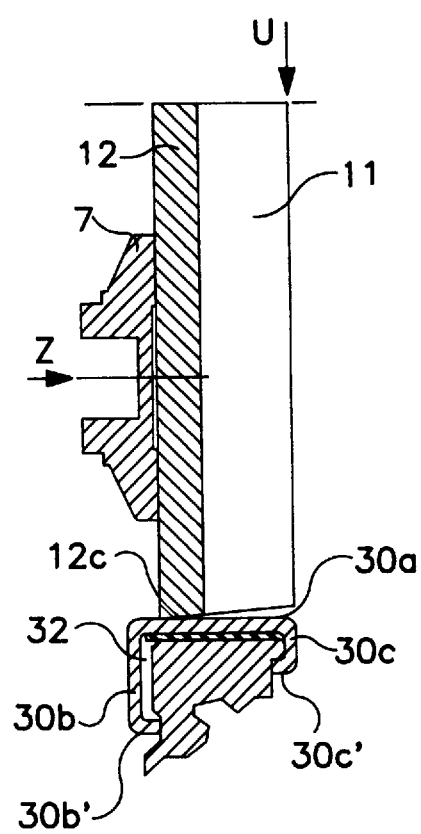
FIGS. 1A and 1B are cross-sectional views of the schematic construction of a first embodiment of the application arrangement, of which a teflon bearing is used.

In reference to FIGS. 1 to 3, a first embodiment of the invention will now be described in detail. In this first embodiment, a spring bow element 30 is clamped onto an area 22 of a brake lining compartment 20 with the insertion of a teflon layer 41 therebetween. A brake lining 10 consists of a pressure plate 12 and a brake lining material 11 fixed to it. The surface of the brake lining material 11 which faces away from the pressure plate 12, for the braking, is brought in contact with the assigned friction surface of a (not shown) brake disc. In the drawings, it is assumed that the brake disc rotates in the direction indicated by the arrow U. An application arrangement is shown only schematically as a pressure stamp 7 which, during the application of the disc brake, that is, during the actuating of the brake, is moved in a direction indicated by the arrow Z.

First, it should be pointed out that all figures marked with the letter A indicate the inoperative condition of the brake or an initial condition of the actuating of the brake while the figures marked by the letter B show the actuating condition of the brake in which the brake lining 10 (or its brake lining material 11) under the effect of a certain brake pressure already rests against the friction surface of the brake disc. In addition, it should be noted that the brake lining compartment 20 naturally also has an area (not shown) which is opposite the area 22 and is shaped correspondingly and forms the second lateral wall of the brake lining compartment 20. If the area shown on the left represents the side of the brake lining compartment 20 which, during the forward driving of the vehicle, is the outlet side, it may under certain circumstances not be necessary to provide, on the not shown opposite lateral area, also a spring bow element 30 which is displaceably disposed on a teflon layer 41 because, during the reverse driving of a vehicle, the braking load is, as a rule, lower. If, however, the concerned disc brake has a parking device for forming a parking brake, it would be advisable to provide the lining support according to the invention on both lateral area of the brake lining compartment 20 because, particularly, during the parking of a vehicle on a slope, high braking forces may occur also in the reverse direction.

Figure 1B:
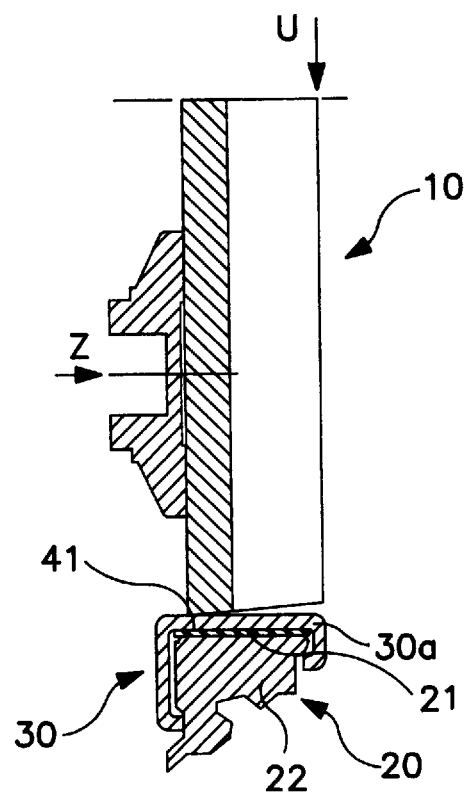

A first embodiment of the first example of the invention will now be explained in detail with reference to FIGS. 1A and 1B. In the case of this embodiment, the spring bow element 30 is essentially constructed as a U-shaped piece which is formed of a plate 30*a* facing a lateral edge 12*c* of the pressure plate 12, of a clamping section 30*b* facing the application arrangement and of a clamping section 30*c* facing the brake disc. The two clamping sections 30*b* and 30*c* reach around the T-shaped area 22 of the brake lining compartment 20 and in each case have sections 30*b'* and 30'*c* bent toward it. Because of this arrangement, the spring bow element 30 is disposed in a sufficiently fixed manner on the T-shaped area 22 of the brake lining compartment 20. Optionally, it may be considered to provide an additional fastening of the spring bow element 30, for example, by screws or by a welding onto the section 30*b'*.

Between the clamping section 30*b* and the area 22 of the brake lining compartment 20, a space 32 is provided which allows the spring bow element 30 or its plate 30*a* facing the pressure plate 12 to move in the application direction with respect to the wall surface 21 of the area 22, specifically along a predetermined path the length of which is essentially defined by the size of the space 32. The length of this path corresponds at least to the length of the displacement path by which the brake lining 10 can still be displaced by the application arrangement when the brake lining 10 rests against the brake disc. As soon as the pressure force exercised by the lateral edge 12*c* of the pressure plate 12 of the brake lining 10 on the plate 30*a* is eliminated during the release of the brake, the plate 30*a* is returned by the spring force of the clamping section 30*b* against the application direction Z back into the starting position of FIG. 1A.

The teflon layer 41 arranged between the plate 30*a* and the wall surface 21 of the brake lining compartment 20 may, for example, be a teflon slide bearing which can be obtained in a finished state and which is fastened, for example, by gluing either on the plate 30*a* or on the wall surface 21.

The bearing arrangement according to the invention operates as follows: At the start of the actuating of the brake, the pressure stamp 7 of the application arrangement is first displaced along a predetermined path in the application direction Z corresponding to a bleeding play of the brake. The brake lining 10 acted upon by the pressure stamp 7 is therefore also displaced toward the brake disc. Since, however, the brake lining material 11 of the brake lining 10 during this initial phase of the displacement does not yet rest against the brake disc, at this point in time, the brake lining 10 is not yet acted upon by any transverse force component for example, in the direction of the arrow U. Even if, at this point in time, the lateral edge 12*c* of the pressure plate 12 of the brake lining 10 already rests against the plate 30*a*, the friction force exercised on the plate 30*a* is still so low that the plate 30*a* is not or is only slightly brought out of its starting position illustrated in FIG. 1A. The lateral edge 12*c* will therefore slide along the plate 30*a*.

Only when, during a further application, the brake lining material 11 of the brake lining 10 rests against the brake disc, the brake lining 10 will be acted upon by means of friction by a transverse force component in the direction of the arrow U which has the result that its lateral edge 12*c* exercises a corresponding force onto the plate 30*a*. The plate 30*a* is therefore displaced into the position illustrated in FIG. 1B, in which case, because of the teflon bearing 41, there will almost be no friction. The advancing force generated by the pressure stamp 7 of the application arrangement is therefore hardly hindered so that the efficiency of the application does not change very significantly. Since this lateral slide bearing also causes no moment of tilt, the brake lining 10 remains in its parallel contact with the brake disc so that also any circumferential diagonal wear can be prevented.

When the application force is reduced during the release of the brake and the brake lining material 11 therefore no longer rests against the brake disc, from the lateral edge 12*c* of the pressure plate 12 of the brake lining 10, also no transverse force is exercised any more on the plate 30*a*. Therefore, as mentioned above, the plate 30*a* is returned by the spring force of the clamping section 30*b* against the application direction Z into the starting position illustrated in FIG. 1A.

Figure 2A:
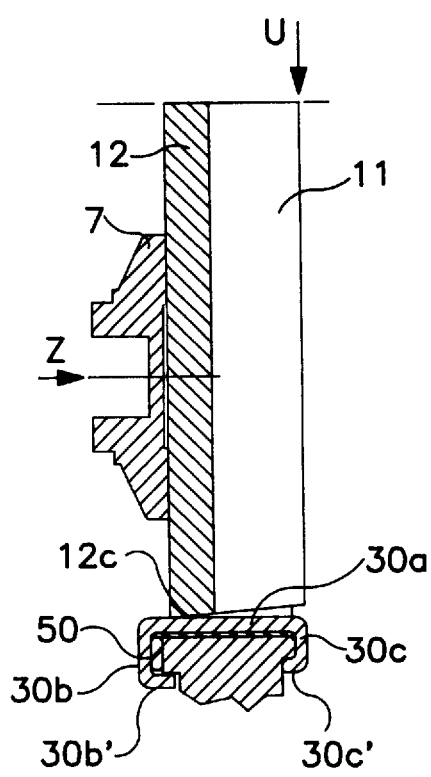
FIGS. 2A and 2B are views of an alternative embodiment of the application arrangement illustrated in FIGS. 1A and 1B.
Figure 2B:
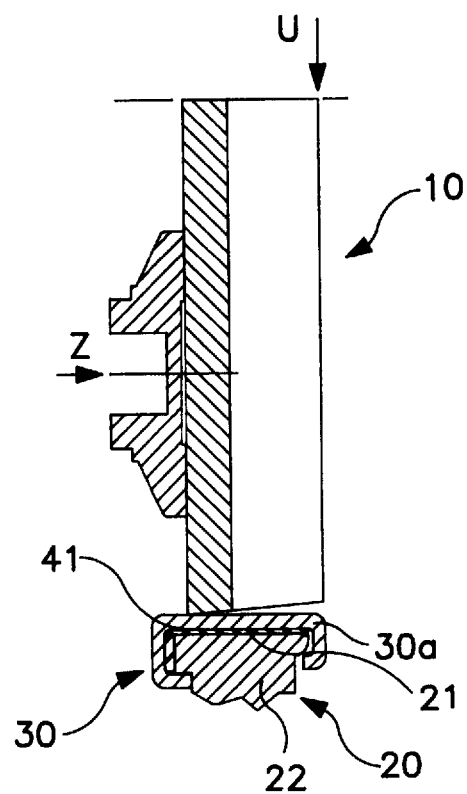

A second embodiment of the first example of the invention is illustrated in FIGS. 2A and 2B. This embodiment differs from the first embodiment only because of the fact that a spring element 50 is arranged in the space 32 between the T-shaped area 22 of the brake lining compartment 20 and the clamping section 30*b*, which spring element 50 is, for example, made of a rubber material. Because the end of the section 30*b'* does not rest against the T-shaped area 22, as shown directly in FIG. 2A, the plate 30*a* is prestressed only by the spring element 50 against the application direction Z. In addition, the method of operation of this embodiment of FIGS. 1A and 1B corresponds to that of the above-explained embodiment so that reference can be made to the above explanations.

Figure 3A:
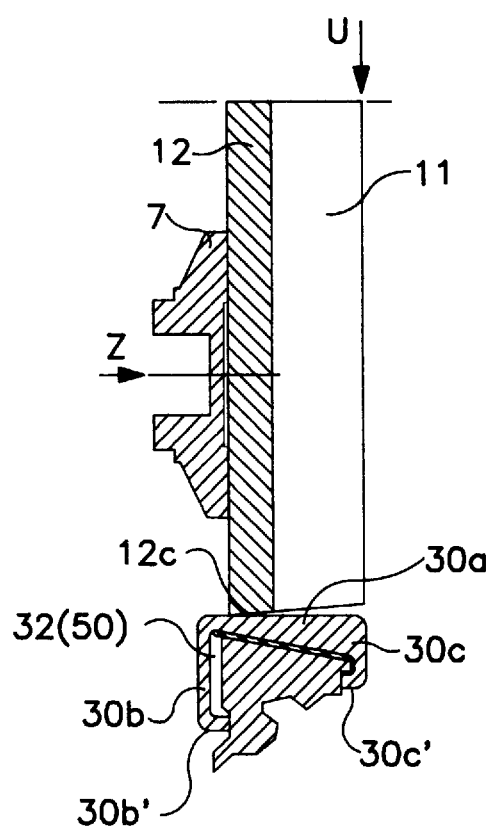
FIGS. 3A and 3B are views of another alternative of the application arrangement illustrated in FIGS. 1A and 1B.
Figure 3B:
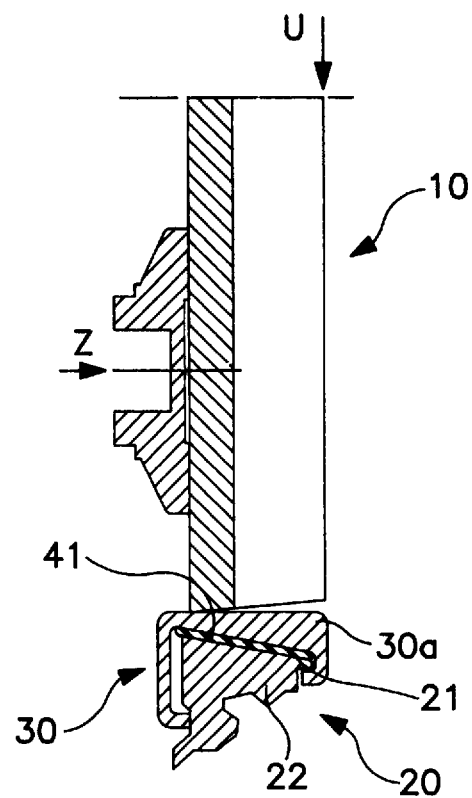

A third embodiment of the first example of the invention is illustrated in FIGS. 3A and 3B. This embodiment differs from the first embodiment essentially in that the surface of the plate 30*a* facing the wall surface 21 of the brake lining compartment 20 is constructed as an oblique plane sloping down in the application direction Z. The lateral surface plate 30*a* facing this oblique plane of surface 21 is constructed for this purpose as a complementarily extending oblique plane; that is, the oblique plane of the plate 30*a*—viewed in the application direction Z—has an ascending course. When the brake disc rotates, it exercises, because of its friction with the brake lining material 11 of the brake lining 10, a certain force on this brake lining which is transmitted to the oblique plane as parallel extending circumferential force in the direction of arrow U. This circumferential force can be split up into a normal force extending perpendicularly to the surface of the oblique plane and into a friction force extending tangentially with respect to the surface of the oblique plane when it is assumed that an equilibrium of forces exists. In the case of which the angle between the circumferential force and the normal force corresponds to the so-called friction angle (in the technical literature, this friction angle is usually call ρ). In this case, the "slope output force" on the oblique plane has exactly the same value as the friction force so that the latter is compensated. This means that the resulting force component in the application direction Z is equal to zero. The application force introduced in the center is therefore not acted upon by a moment of tilt so that the brake lining 10 is pressed completely uniformly against the brake disc and the risk of the occurrence of a diagonal wear is further reduced.

Also in the case of the embodiment illustrated in FIGS. 3A and 3B, the prestressing of the plate 30*a* may possibly be generated by a spring element 50 provided in the space 32.

Figure 4A:
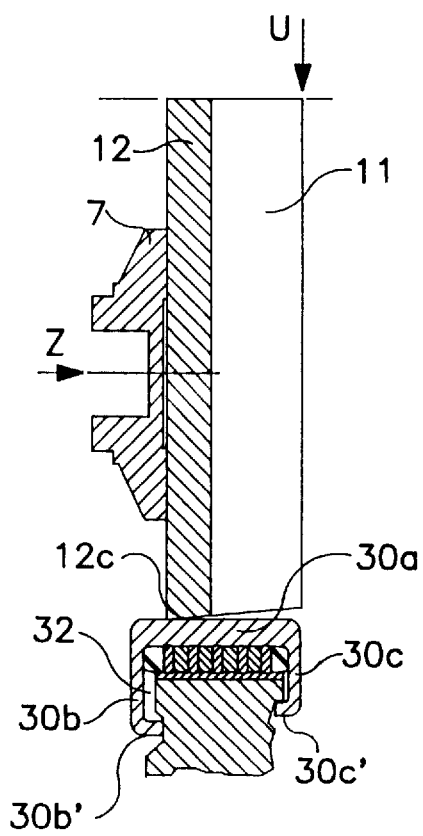
FIGS. 4A and 4B are views of a second embodiment of the application arrangement in which a laminated steel bearing is used.
Figure 4B:
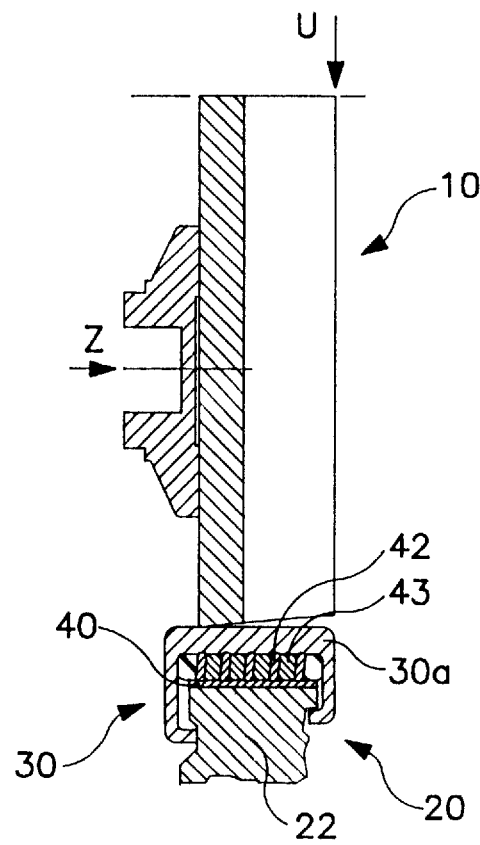

Referring to FIGS. 4 and 5, a second embodiment of the invention will now be described in detail which differs from the first embodiment because of the fact that a laminated steel bearing is provided as the slide bearing surface. In the variant of this embodiment illustrated in FIGS. 4A and 4B, steel lamellae 42 are arranged at a right angle between the inner surface of the plate 30a and the wall surface 21 of the brake lining compartment 20. The steel lamellae 42 are embedded in rubber material 43 which, on the one hand, ensures a defined position of the steel lamellae and, on the other hand, permits a tilting movement of the steel lamellae which prevents friction. In the application position illustrated in FIG. 4B, the steel lamellae 42 are therefore sloped diagonally downward. It may be considered to provide a hardened surface 40 between the wall surface 21 and the steel lamellae 42.

Figure 5A:
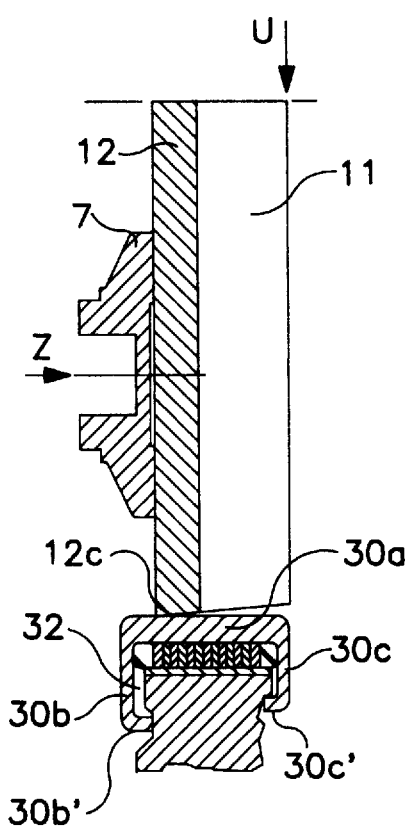
FIGS. 5A and 5B are views of an alternative embodiment of the application arrangement illustrated in FIGS. 4A and 4B.
Figure 5B:
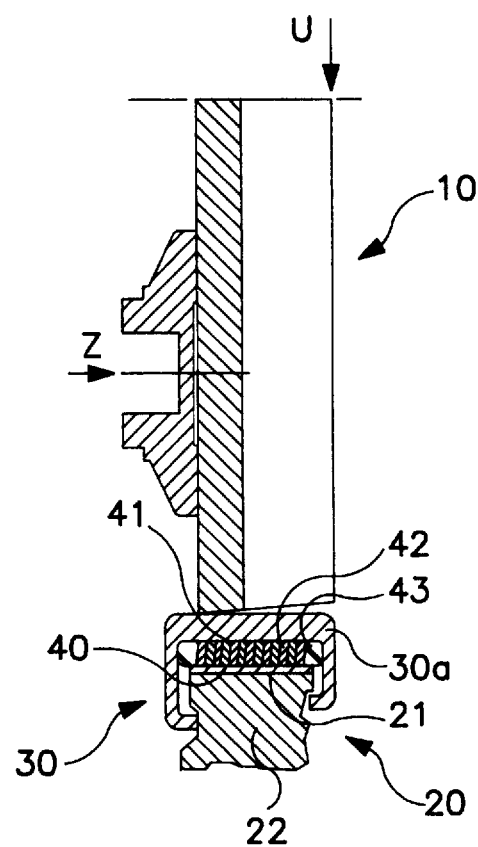

The variant of this embodiment illustrated in FIGS. 5A and 5B differs from the above-described variant of FIGS. 4A and 4B in that the steel lamellae 42 are bordered only on the edge by the rubber material 43 and are sealed off simultaneously so that a larger number of steel lamellae 42 can be accommodated. This variant is therefore suitable for larger loads.

Figure 7A:
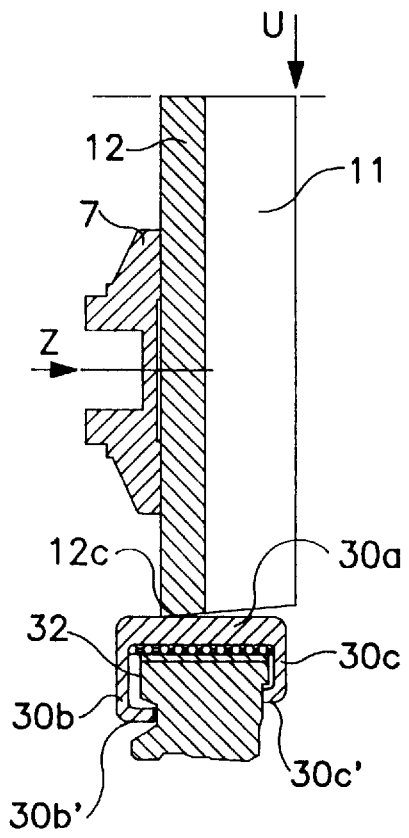
FIGS. 7A and 7B are views of an alternative embodiment of the application arrangement illustrated in FIGS. 6A to 6D.
Figure 7B:
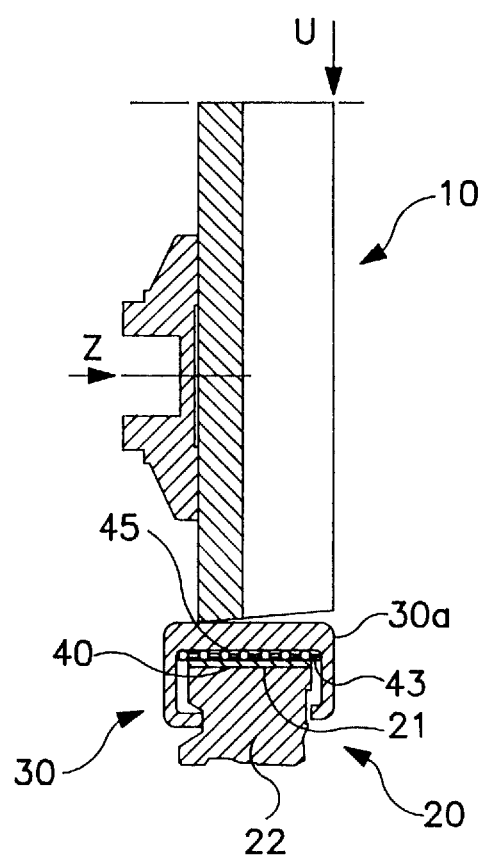

FIGS. 6 and 7 illustrate a third embodiment of the invention in the case of which a roller bearing is provided for the bearing. In the case of the embodiment illustrated in FIGS. 6A to 6D, rollers 45 of this roller bearing are in each case connected with one another by strips 46 of rubber material. These rubber material strips 46 form a quasi-cage for the rollers 45 which permits a certain rotation of the rollers 45 which is completely sufficient for the purposes of the invention. FIG. 6C is an enlarged cutout of FIG. 6A, and FIG. 6D is an enlarged cutout of FIG. 6B. The variant illustrated in FIGS. 7A and 7B differs from the above variant Of FIGS. 6A–6D only because of the fact that the rubber material 46 almost completely encloses the rollers 45. As required, care may have to be taken in this case that the rollers 45 can still rotate to a certain extent inside the rubber material 46.

Also in the case of these roller bearings, a hardened surface 40 is preferably provided between the wall surface 21 and the respective roller bearing 45.

Figure 8A:
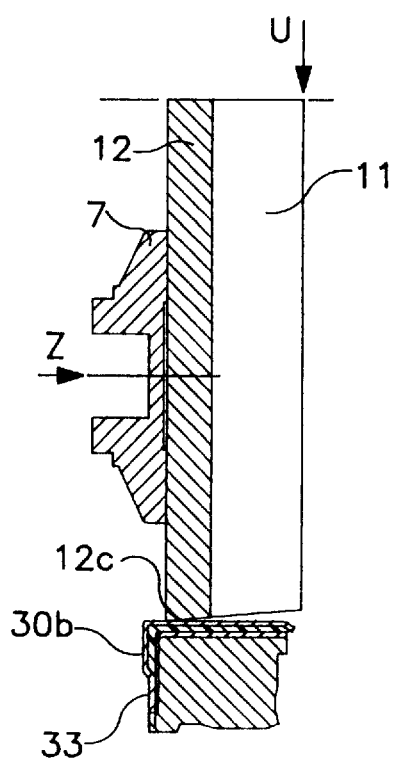
FIGS. 8A and 8B are views of a fourth embodiment of the application arrangement, in which an alternative embodiment of a spring bow element is used.
Figure 8B:
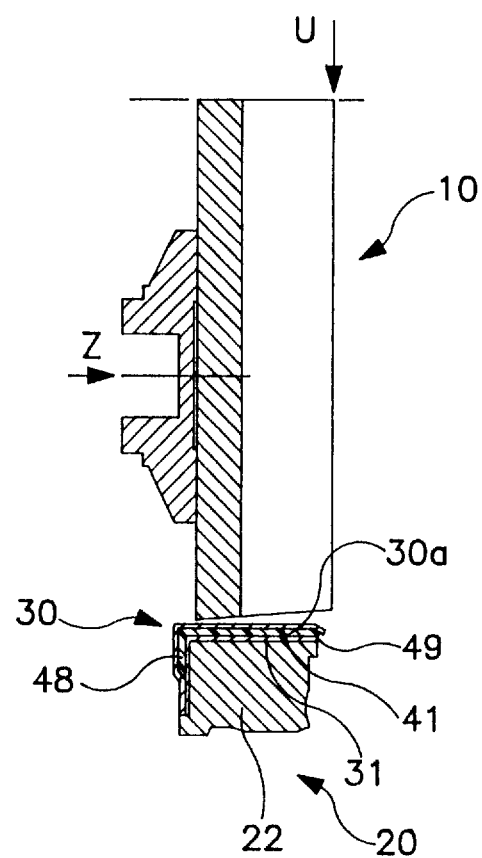

In the case of the fourth embodiment illustrated in FIGS. 8A and 8B, an alternative embodiment of the spring bow element is used. As easily recognizable in the cross-sectional representation, this spring bow element consists of a first element 30 which faces the brake lining 10 and also forms the wall 30a, and of a second element 31 which is essentially an L-angle piece and is fastened on a correspondingly shaped section of the brake lining compartment 20, for example, by welding or gluing or by screws or rivets. The two elements 30 and 31 are fastened to one another on an area 33. The first element 30 has a section 30b which extends from there and is directed upwards, which section 30b permits a resilient yielding of the wall 30a in the application direction. In order to prevent a contamination, a rubber material 48 is provided below the section 30b and, at the same time, promotes the desired spring-back resilience. In the area between the plate 30a and the opposite section of the second element 31, a slide bearing 41 is arranged which is preferably made of teflon. However, optionally, one of the bearings illustrated in the above-described embodiments may also be used. On the lower end, a seal 49 is provided which is made, for example, of rubber. Since the method of operation of this embodiment corresponds to that of the other embodiments, the explanation does not seem to have to be repeated.

Figure 9A:
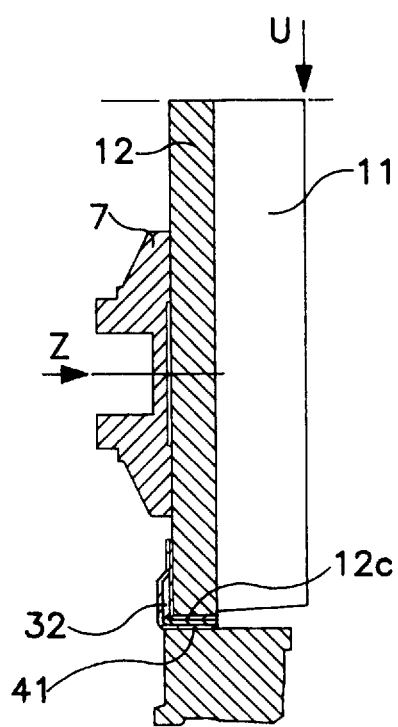
FIGS. 9A and 9B are views of an embodiment of a slidably disposed plate fastened on the brake lining.
Figure 9B:
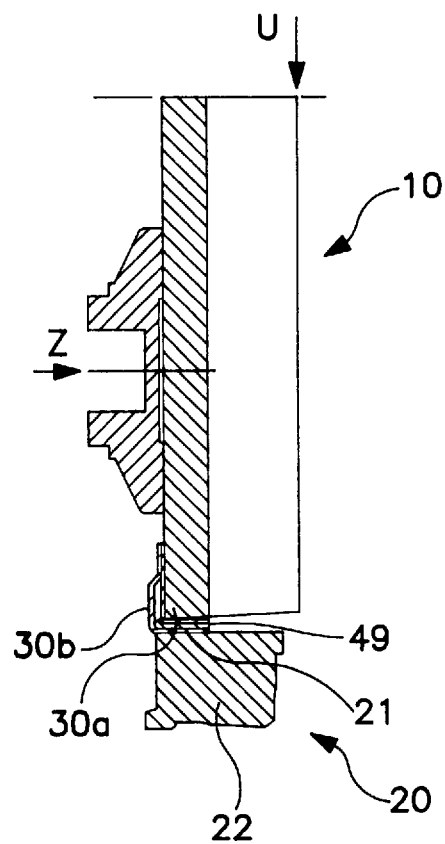

The fifth embodiment illustrated in FIGS. 9A and 9B is an alternative embodiment of the embodiment of FIGS. 8A and 8B. The spring bow element 30, 31 is not fastened on the brake lining compartment 20 but on the pressure plate 12 of the brake lining 10. However, the construction and method of operation correspond largely to the previous embodiment, so that the explanation surely does not have to be repeated. The present embodiment has the advantage that the brake lining compartment 20 does not have to be modified so that the retrofitting of already available disc brakes is easily possible. This embodiment can also be used when, for reasons of cost or manufacturing difficulties, the modification of the brake lining compartment required in the other embodiments is not possible.

Naturally, it is possible to provide the oblique plane illustrated in FIG. 3 also in the case of the other embodiments of the invention.

It does not have to be further described that it is recommended that the explained principle of the invention also be used in the case of the brake lining accommodated in the lining compartment opposite the brake disc.

Concerning other characteristics and effects of the invention, which are not explained in detail, reference is explicitly made to the drawing.

I claim:

1. Application arrangement for a disc brake including a brake lining compartment having two lateral guide surfaces extending in an application direction for guiding a brake Lining displaced by the application arrangement, said brake lining being supported on a respective outlet-side guide surface when it rests against a brake disc during braking, wherein the respective guide surface of the brake lining compartment comprises:

a rigid plate on either a wall surface of the brake lining compartment or on a lateral edge of the brake lining and disposed so that it can be displaced with respect to the wall surface in the application direction along a predetermined path; and a surface of the plate facing the wall surface of the brake lining compartment being an oblique plane sloping down in the application direction.

2. Application arrangement according to claim 1, wherein the plate is prestressed against the application direction such that, after the release of the brake, the plate moves back into a starting position.

3. Application arrangement according to claim 2, wherein the plate is part of a spring bow element.

4. Application arrangement according to claim 3, wherein the brake lining includes a brake lining material and a pressure plate acted upon by the application arrangement; and the spring bow element is fastened to a lateral edge of the pressure plate.

5. Application arrangement according to claim 1 wherein the plate is provided at least on the side of the brake lining compartment which is the outlet side during the forward driving of the vehicle.

6. Application arrangement according to claim 1, wherein the oblique angle splits a circumferal force from the brake lining into a force along the sloped surface of the plate compensating friction forces along the sloped surface.

7. Application arrangement according to claim 1, wherein the wall surface of the brake lining compartment is an oblique plane complementary to the oblique plane of the plate.

8. Application arrangement for a disc brake including a brake lining compartment having two lateral guide surfaces extending in an application direction for guiding a brake lining displaced by the application arrangement, said brake lining being supported on a respective outlet-side guide surface when it rests against a brake disc during braking, wherein the respective guide surface of the brake lining compartment comprises:

a rigid plate on either a wall surface of the brake lining compartment or on a lateral edge of the brake lining and disposed so that it can be displaced with respect to the wall surface in the application direction along a predetermined path by a teflon bearing or a plurality of steel lamellae or a plurality of rollers.

9. Application arrangement according to claim 8, wherein the steel lamellae are separated by a rubber material.

10. Application arrangement according to claim 8, wherein the rollers are separated by a rubber material.

11. Brake lining for use in a brake lining compartment of an application arrangement of a disc brake and the brake lining having two lateral edges displaceably guided on two lateral guide surfaces of the brake lining compartment which extend in an application direction and to be supported on the respective outlet-side guide surface when, during bthe braking, it rests against a brake disc, wherein:

on a respective lateral edge of the brake lining, a rigid plate is disposed which is displaceable in the application direction along a predetermined path with respect to an assigned lateral surface of the brake lining compartment; and a surface of the plate facing the wall surface of the brake lining compartment being an oblique plane sloping down in the application direction.

12. Brake lining according to claim 11, wherein the plate is prestressed against the application direction such that, after the release of the brake, the plate moves back into a starting position.

13. Brake lining according to claim 12, wherein the plate is prestressed against the application direction by a spring element consisting of a rubber material.

14. Brake lining according to claim 12 wherein the plate is part of a spring bow element.

15. Brake lining according to claim 14, wherein the brake lining includes a brake lining material and a pressure plate acted upon by the application arrangement; and the spring bow element is fastened on the lateral edge of the pressure plate.

16. Brake lining according to claim 15, wherein the plate is disposed to be slidably displaceable with respect to the lateral edge of the pressure plate by a teflon bearing or by way of a plurality of steel lamellae or is disposed to be rollably displaceable by a plurality of rollers with respect to the lateral edge of the pressure plate.

17. Brake lining according to claim 11 wherein the plate is provided at least on a side of the brake lining which is the outlet side during the forward driving of the vehicle.

18. Application arrangement for a disc brake including a brake lining compartment having two lateral guide surfaces extending in an application direction for guiding a brake lining displaced by the application arrangement, said brake lining being supported on a respective outlet-side guide surface when it rests against a brake disc during braking, wherein the respective guide surface of the brake lining compartment comprises:

a rigid plate on either a wall surface of the brake lining compartment or on a lateral edge of the brake lining and disposed so that it can be displaced with respect to the wall surface in the application direction along a predetermined path; and a spring consisting of a rubber material prestressing the plate against the application direction.

19. Application arrangement for a disc brake including a brake lining compartment having two lateral guide surfaces extending in an application direction for guiding a brake lining displaced by the application arrangement, said brake lining being supported on a respective outlet-side guide surface when it rests against a brake disc during braking, wherein the respective guide surface of the brake lining compartment comprises:

a rigid plate on either a wall surface of the brake lining compartment or on a lateral edge of the brake lining and disposed so that it can be displaced with respect to the wall surface in the application direction along a predetermined path; and the plate being a part of a spring bow element which is disposed on an area of the brake lining compartment having a T-shaped cross-section.

* * * * *